US006568749B2

(12) United States Patent
Sawayanagi et al.

(10) Patent No.: US 6,568,749 B2
(45) Date of Patent: May 27, 2003

(54) BRACKET ATTACHED TO VEHICLE BODY

(75) Inventors: Masahiro Sawayanagi, Shizuoka (JP);
Wendelio Taclibon, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/753,684

(22) Filed: Jan. 4, 2001

(65) Prior Publication Data
US 2001/0007397 A1 Jul. 12, 2001

(30) Foreign Application Priority Data

Jan. 7, 2000 (JP) ........................................ 2000-001809

(51) Int. Cl.⁷ ............................................... B62D 25/06
(52) U.S. Cl. ...................................... 296/214; 248/200
(58) Field of Search ............................ 296/97.9, 97.11, 296/97.12, 97.13, 210, 214; 248/200

(56) References Cited

U.S. PATENT DOCUMENTS

| | | | |
|---|---|---|---|
| 3,213,189 A | * 10/1965 | Mitchell et al. | 248/27.1 |
| 3,894,782 A | * 7/1975 | Hug | 248/27.1 |
| 4,262,181 A | * 4/1981 | Tufano et al. | 248/27.1 |
| 5,269,060 A | * 12/1993 | Dowd et al. | 296/97.13 |
| 5,475,577 A | * 12/1995 | Vanderhoof et al. | 248/27.1 |
| 5,499,854 A | * 3/1996 | Crotty et al. | 296/97.13 |
| 5,544,928 A | * 8/1996 | Mori et al. | 296/97.9 |
| 5,752,853 A | * 5/1998 | Curtindale | 296/97.9 |
| 5,857,728 A | * 1/1999 | Crotty, III | 296/97.9 |
| 6,003,928 A | * 12/1999 | Curtindale | 296/97.9 |
| 6,007,136 A | * 12/1999 | Zittwitz et al. | 296/97.9 |
| 6,068,323 A | * 5/2000 | Brown et al. | 296/97.9 |
| 6,113,253 A | * 9/2000 | Yoshii et al. | 296/97.13 |

FOREIGN PATENT DOCUMENTS

| | | | |
|---|---|---|---|
| JP | 63-72115 | 5/1988 | B60J/3/02 |
| JP | 7-47839 | 2/1995 | B60J/3/02 |
| JP | 11-78521 | 3/1999 | B60J/3/02 |
| JP | 11-507309 | 6/1999 | B60J/3/00 |

OTHER PUBLICATIONS

Patent Abstract of Japan 11–078521.
Patent Abstract of Japan 07–047839.

* cited by examiner

Primary Examiner—D. Glenn Dayoan
Assistant Examiner—Lori L Coletta
(74) Attorney, Agent, or Firm—Sughrue Mion, PLLC

(57) ABSTRACT

The base member (7) composing a portion of the bracket (1) of the present invention includes: a fitting section (2) engaged with an attachment opening of the roof trim which is an interior wall member on the reverse face of the substantially elliptical base plate (6); an elastic fitting section (3), which is elongated and is curved into a plane arc shape, elastically engaged with a peripheral edge of the attachment opening on the fitting section (2) opposed with respect to the opening (8); and a flange section (4) coming into contact with an upper face of the roof trim (35). The cross-section of this elastic fitting section (3) is a substantial U-shape. The flexible piece (3a), in which a space for bend is formed, is vertically arranged outside at the base bottom section in such a manner that the flexible piece (3a) rises upward. On the outer circumferential face of the flexible piece (3a), there is provided a non-slip section (9) including a plurality of transverse grooves coming into contact with the peripheral edge face of the attachment opening.

5 Claims, 10 Drawing Sheets

BRACKET ATTACHED TO VEHICLE BODY

BACKGROUND OF THE INVENTION

The present invention relates to a bracket capable of being engaged with an interior wall member such as a roof trim of a vehicle and also capable of being engaged with a vehicle body panel by one-touch operation, and at the same time the bracket is capable of electrically connecting with an electric wire for supplying electric power.

There are provided various types of bracket structures to be attached to a roof trim of a vehicle.

A bracket 31 shown in FIG. 8 is an example of the bracket applied to a sun visor having illumination. As shown in FIG. 8, the bracket 31 includes: a base member 37 interposed between a roof panel 33, which is a vehicle body panel, and a roof trim 35 which is an interior wall member to cover a surface of the roof panel 33; a main body 39 attached to one end of a shaft 38 which is attached to a sun visor body not shown in the drawing; screw members 43, 45 for fixing the base member 37 and the main body 39 to the roof panel 33; and a cover 47 for covering a surface of the main body 39.

The base member 37 is made of insulating material such as synthetic resin and includes: a diameter expanding section 51c composed of a pair of circumferential walls 51a which are divided by slits 51b; a substantially cylindrical panel engaging member 51 press-fitted into a fitting hole 33a of the roof panel 33; an opening 37a into which the cylindrical section 39b at the center of the main body 39 is inserted; a pair of flexible elastic pieces 52 vertically arranged at the peripheral edge of the opening, engaging with the engaging protrusion 39a of the cylindrical section 39b; and a screw insertion hole 54 into which the screw member 45 is inserted.

As shown in FIG. 9, on the reverse side of the base member 37, a base plate 55 includes: a fitting section 58 fitted with an attachment opening 35a of the roof trim 35; a flange section 59 coming into contact with an upper face of the roof trim 35; and four L-shaped trim engaging member 61 for holding the peripheral edge of the attachment opening 35a of the roof trim 35 on the fitting section 58 together with the flange section 59. At a position corresponding to the panel engaging member 51, there is provided an electric connecting section 53 on the base member side for holding the terminal 41a (shown in FIG. 8) of the power supply electric wire 41.

The main body 39 is made of insulating material such as synthetic resin. As shown in FIG. 8, the main body 39 includes electric connecting sections 34, 36 provided on the main body side for positioning and holding the terminal 56 of the connection electric wire 42a on the sun visor side and the terminal 57 of the electric wire 42b for earth, wherein the cylindrical section 39b is interposed between the terminals 56 and 57.

Next, the procedure for attaching the bracket 31 to the roof trim 35 and the roof panel 33 described above will be explained as follows.

First, as shown in FIGS. 10 and 11, after the terminal 41a of the power supply electric wire 41 has been positioned and held at the electric connecting section 53 of the base member 37, the base member 37 is attached to the opening 35a of the roof trim 35 by the trim engaging member 61.

As shown in FIG. 14, when four positions of the peripheral edge of the attachment opening 35a are interposed between the flange section 59 and the trim engaging member 61 as shown in FIG. 14, the base member 37 is engaged with the roof trim 35.

On the other hand, the terminals 56, 57 at the end portions of the electric wires 42a, 42b are held by the electric connecting sections 34, 36 on the main body 39 side (shown in FIG. 8).

Next, as shown in FIGS. 11 and 12, the cylindrical section 39b of the main body 39 is inserted into the opening 37a of the base member 37. When the engaging protrusion 39a protruding from the outer circumference of the cylindrical section 39b is engaged with the flexible elastic piece 52 of the base member 37, the main body 39 can be detachably engaged with the base member 37 attached to the roof trim 35. Therefore, the roof trim 35 can be handled as a roof module in which the sun visor having illumination is previously integrated into one body via the bracket 31.

Next, as shown in FIGS. 12 and 13, the roof trim 35, which is integrated as a roof module, is attached to the roof panel 33. In this case, when the panel engaging member 51 of the base member 37 is press-fitted into the fitting hole 33a of the roof panel 33, the extended diameter section 51c of the panel engaging member 51 is hooked at and engaged with the fitting hole 33a.

Finally, when the screw members 43, 45 are fastened, the attaching work for attaching the sun visor having illumination is completed.

As described above, in the base member 37 of the related bracket 31, as shown in FIGS. 14 and 15 which are cross-sectional views taken on a line B—B in FIG. 9, when the thickness of the attachment opening 35a of the roof trim 35 is at least in a setting range not less than the clearance formed between the flange section 59 and the trim engaging member 61, the roof trim 35 at the peripheral edge of the attachment opening 35a is interposed and held between the flange 59 and the trim engaging member 61 as shown in FIG. 14.

However, the following problems may be encountered. As shown in FIG. 15, when the thickness of the peripheral edge of the attachment opening 35a is small so that it is out of the setting range, clearance G is generated between the flange section 59 and the trim engaging member 61. This clearance G causes noise while a car is running.

SUMMARY OF THE INVENTION

The present invention has been accomplished to solve the above problems. It is an object of the present invention to provide a bracket can be easily attached to the roof trim (interior wall member) so as not to be restricted by the thickness of the interior wall member.

In order to achieve the above object, according to the present invention, there is provided a bracket for attaching an interior equipment of a vehicle into a fitting hole formed in an interior wall member covering an inner face of a vehicle body panel, comprising:

a base member placed on the fitting hole from a side facing the vehicle body panel;

a main body provided with the interior equipment, and engaged with the base member from a side facing interior of the vehicle for holding the interior wall member therebetween; and an elastic fitting member formed on the base member so as to elastically contact with an inner circumferential face of the fitting hole from a normal direction of the inner circumferential face.

In this configuration, since the base member can be easily attached to the interior wall member, the attaching work can be efficiently conducted.

Furthermore, since the inner circumferential face of the fitting hole is pushed from the normal direction thereof by the elastic fitting member, the base member does not become rickety. Accordingly, the thickness of the applicable interior wall member is not restricted. Further, there is no possibility that noise is generated.

Preferably, the elastic fitting member has a contact face provided with a non-slip member with respect to the inner circumferential face of the fitting hole.

In this configuration, the base member can be more strongly fitted with the interior wall member, and the reliability can be more enhanced.

Preferably, the non slip member includes a plurality of transverse grooves.

In this configuration, since it becomes difficult for the base member to slip in the direction of disengagement, the reliability can be more enhanced.

Preferably, the elastic fitting member is arcuately elongated along the inner circumferential face of the fitting hole.

In this configuration, since the contact area of the interior wall member with the elastic fitting member is increased, it is possible to prevent the base member from becoming rickety and further it is possible to prevent the base member from being displaced even when external forces are given to it in various directions.

DETAILED DESCRIPTION OF THE PREFERRED EMBODIMENTS

Referring to FIGS. 1 to 7, an embodiment of the bracket of the present invention will be explained below in detail. Same reference numbers are assigned to the parts as same as those of the related bracket. Detailed explanation for those are omitted.

Figure 1:
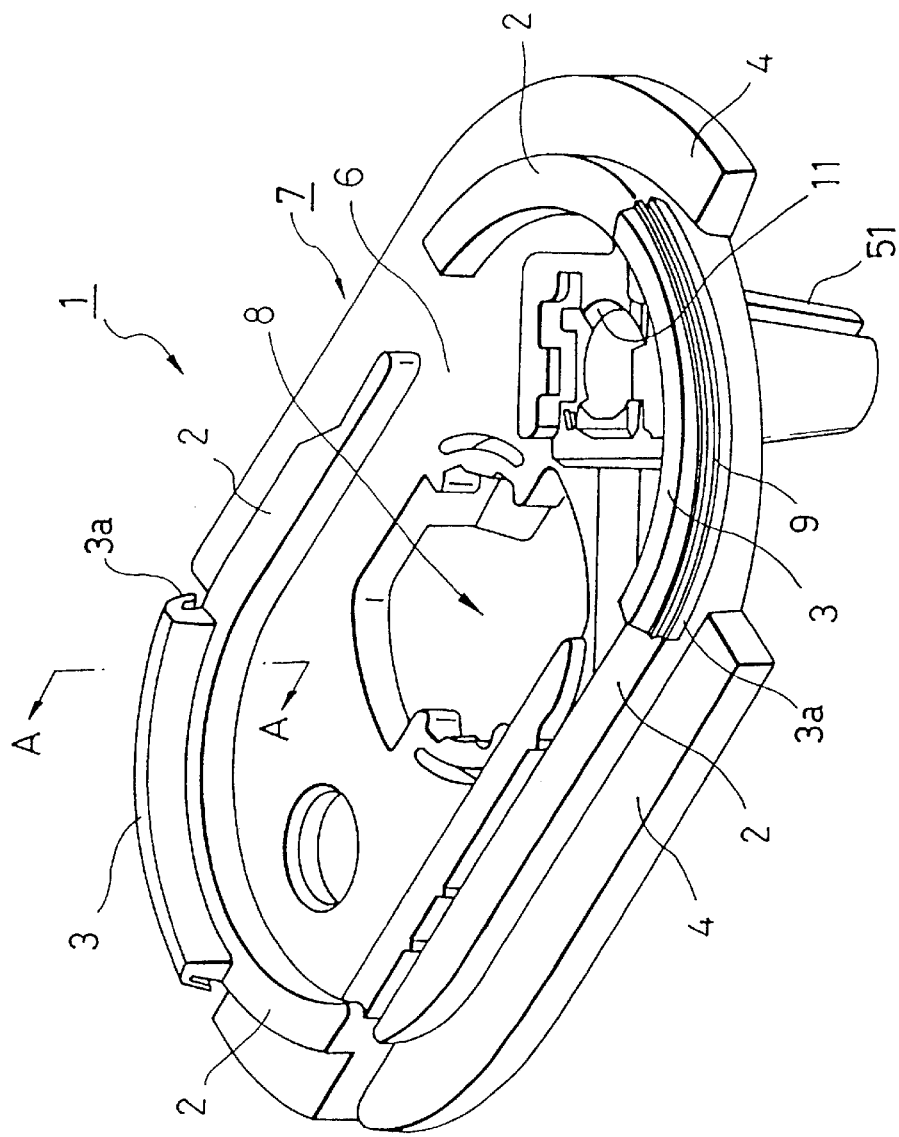
FIG. 1 is a perspective view showing a reverse face of a base member of a bracket according to one embodiment of the present invention.

As shown in FIG. 1, a base member 7 composing a portion of the bracket 1 of this embodiment includes: a fitting section 2 engaged with an attachment opening 35*a* (shown in FIG. 2) of a roof trim 35 which is an interior wall member on the reverse face of a substantially elliptical base plate 6 made of insulating material such as synthetic resin; an elastic fitting section 3, which is elongated and curved into a plane arc shape, elastically engaged with a peripheral edge of the attachment opening 35*a* on the fitting section 2 opposed with respect to the opening 8; and a flange section 4 coming into contact with an upper face of a roof trim 35.

In this connection, an electric connecting section 11 on the base member side for holding a terminal 41*a* (shown in FIG. 2) of a power supply electric wire 41 is provided at a position corresponding to a panel engaging member 51.

Figure 6:
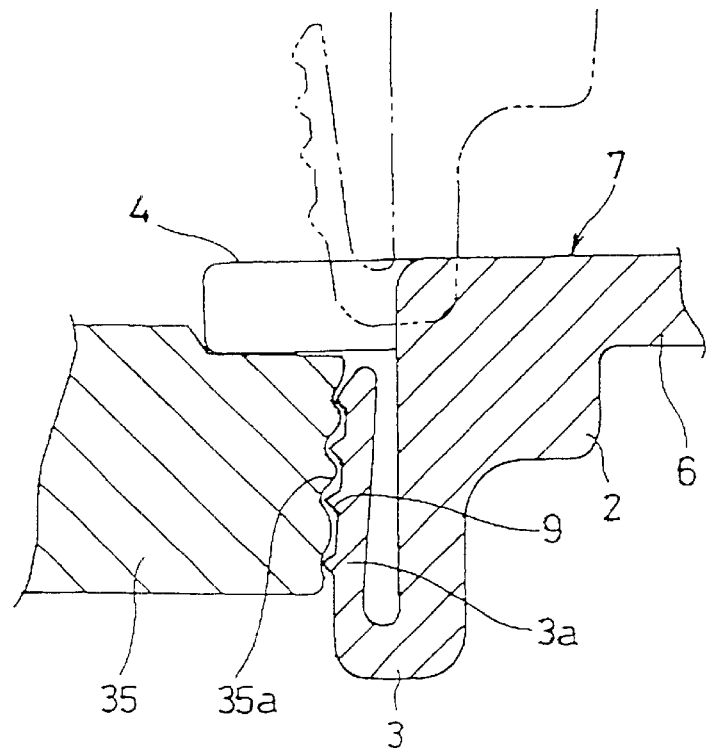
FIG. 6 is a cross-sectional view taken on the line A—A in FIG. 1, showing an elastic engaging section of the base member shown in FIG. 3.
Figure 7:
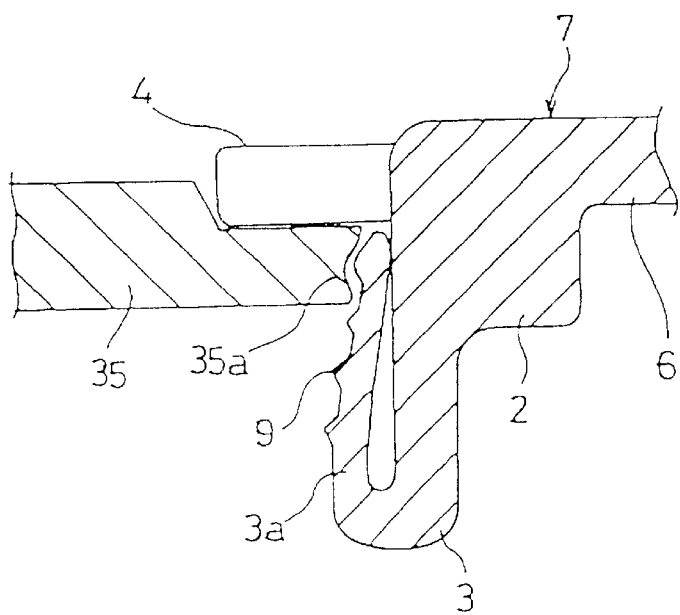
FIG. 7 is a partially enlarged view showing a case in which the roof trim shown is thin.
Figure 8:
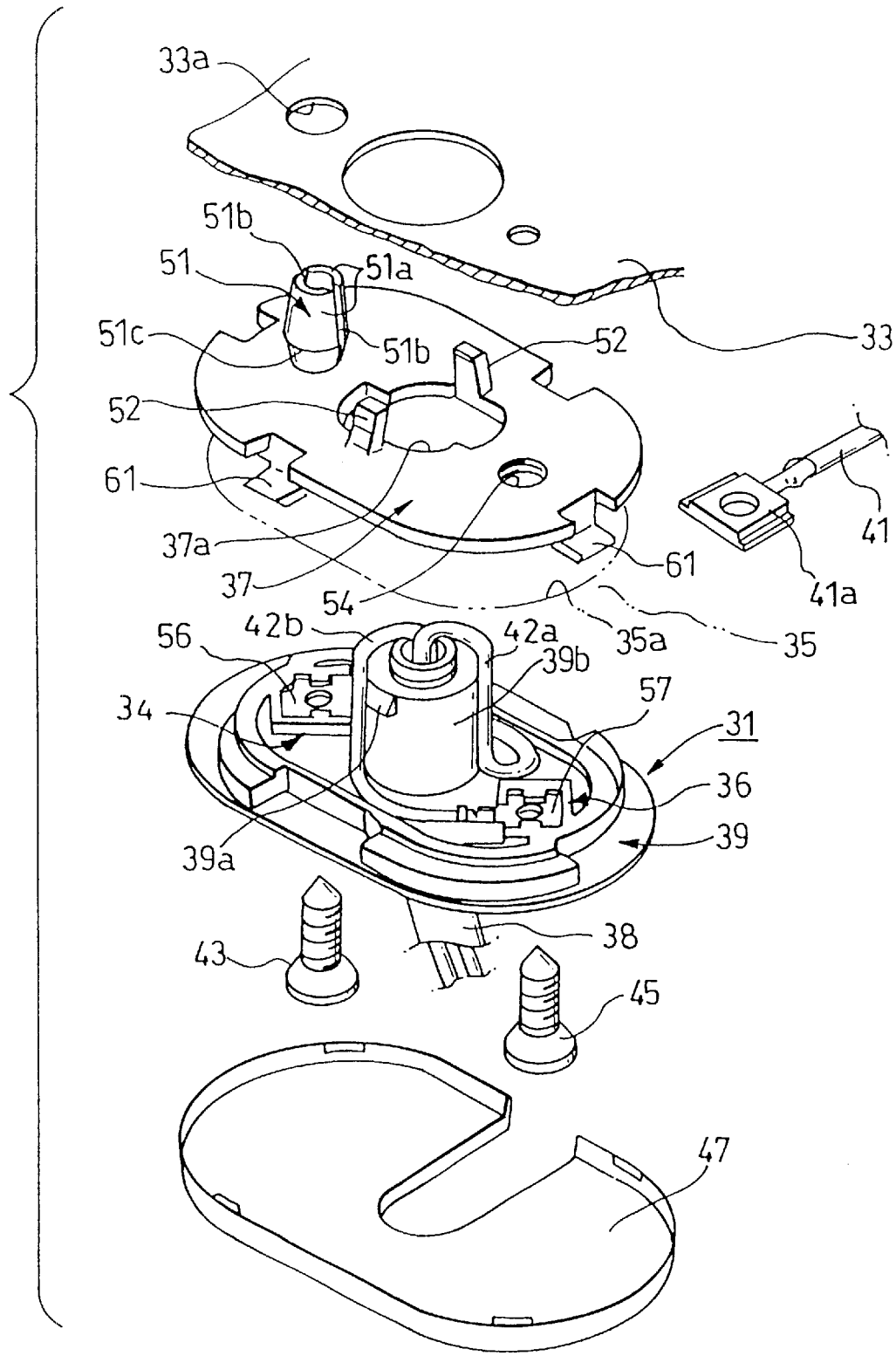
FIG. 8 is an exploded perspective view of a related bracket used for a sun visor having illumination.
Figure 9:
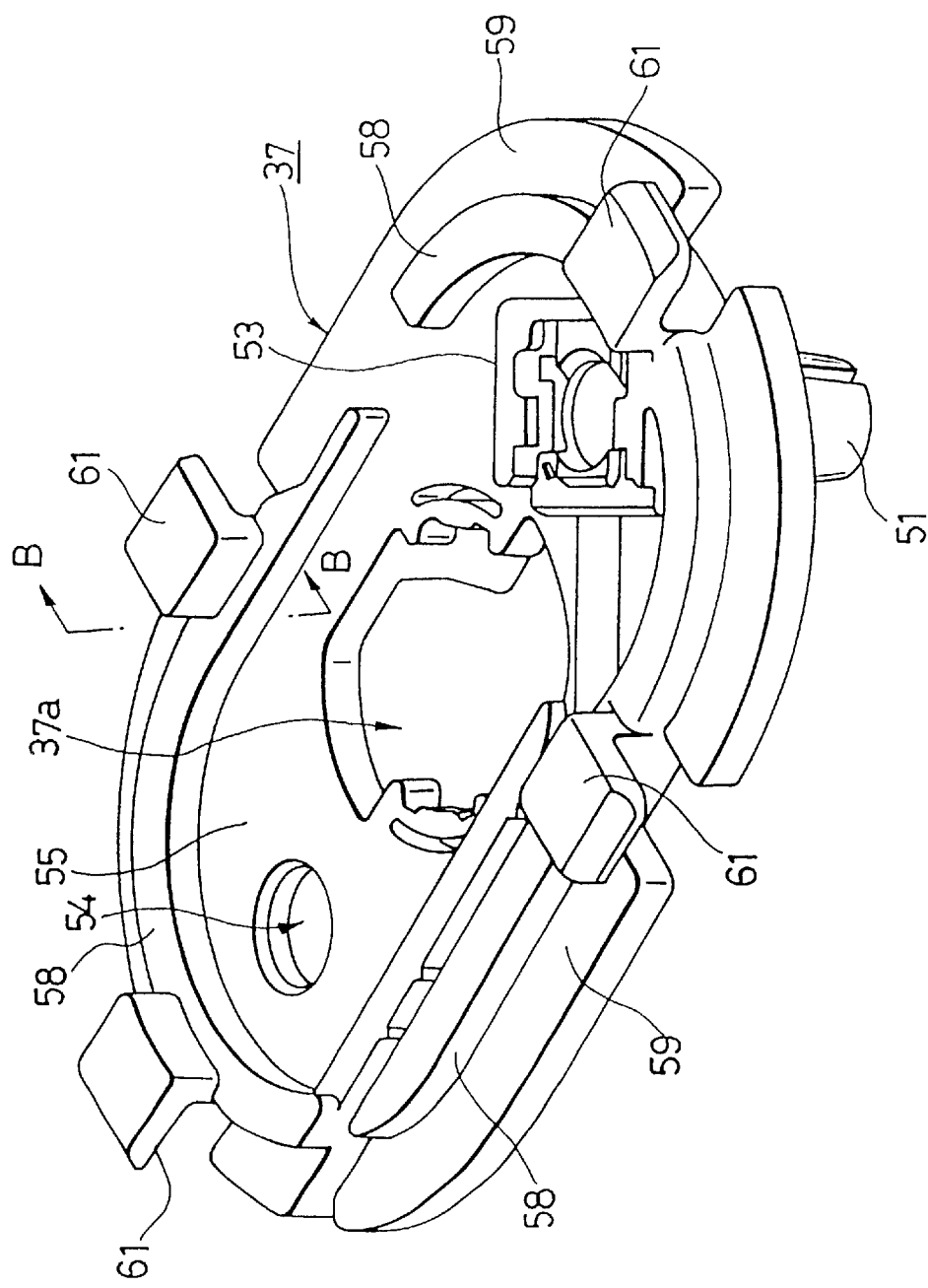
FIG. 9 is a perspective view showing a reverse side of the base member shown in FIG. 8.
Figure 10:
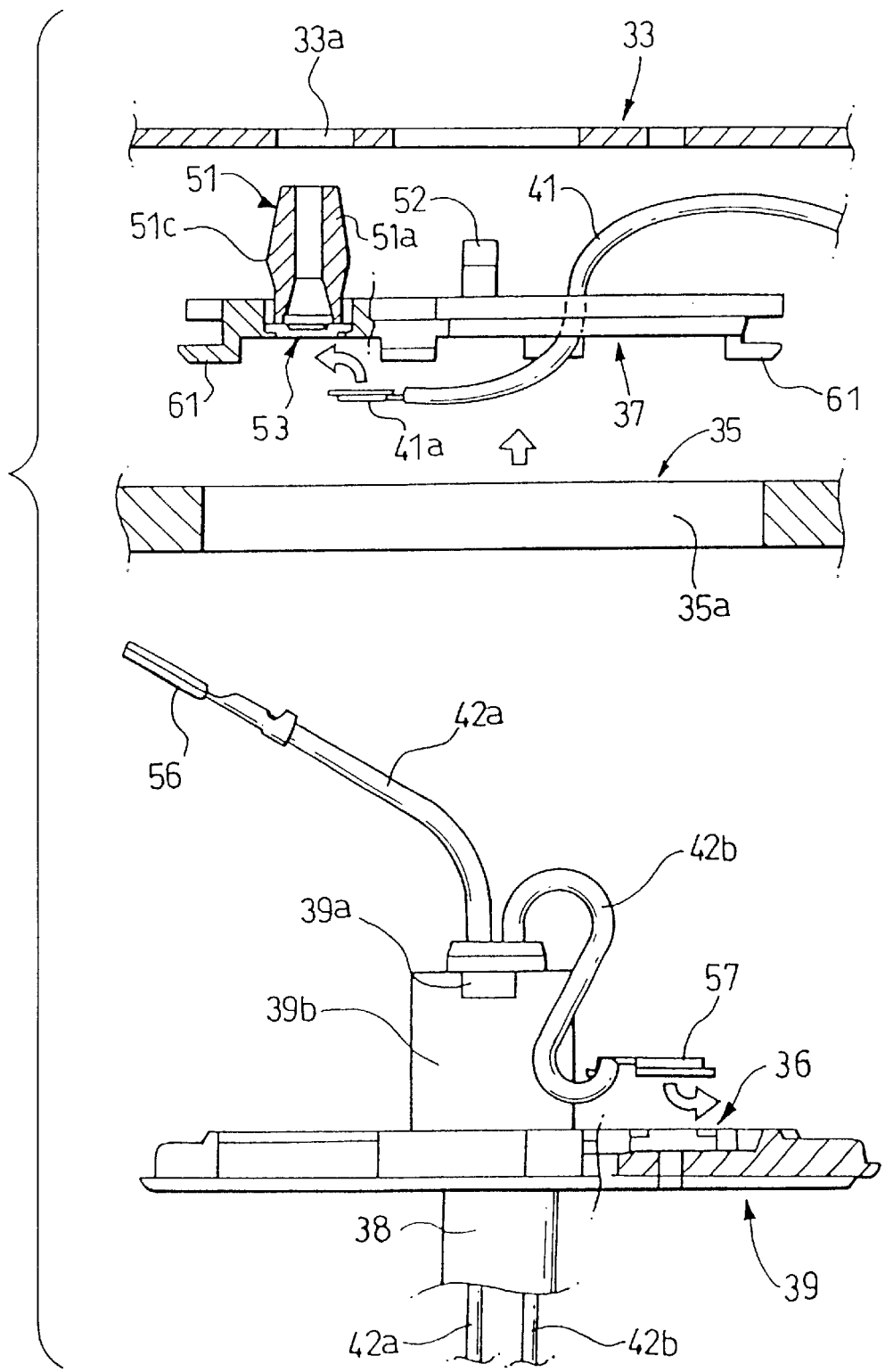
FIG. 10 is a cross-sectional view for explaining an initial stage of assembling the related bracket.
Figure 11:
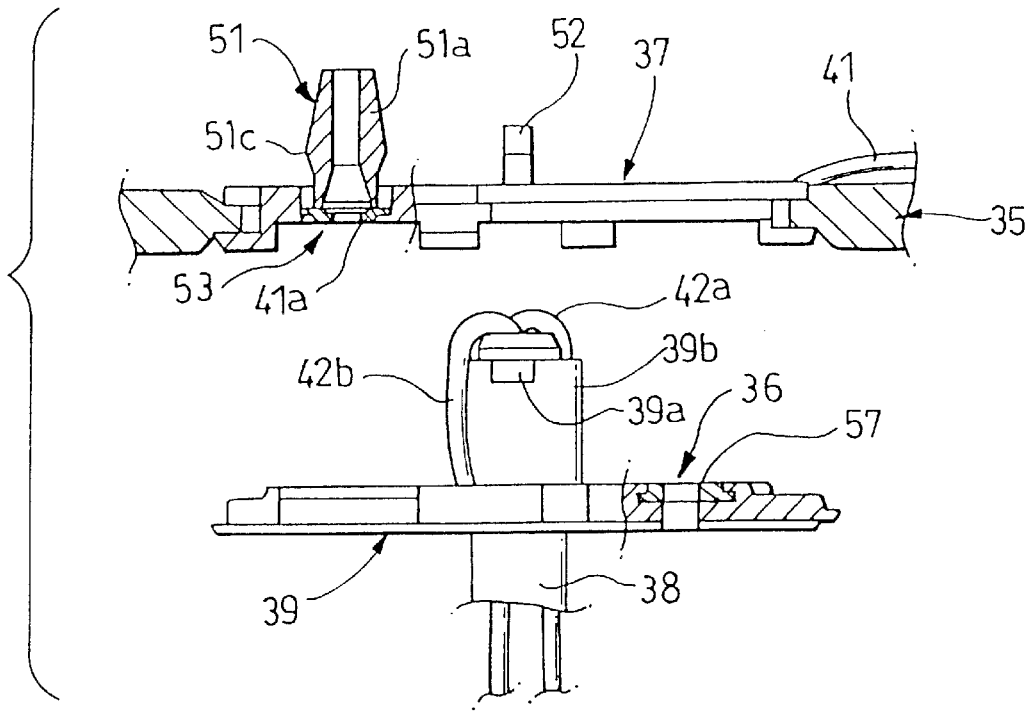
FIG. 11 is a cross-sectional view showing a state in which the base member is attached to the roof trim shown in FIG. 10.
Figure 12:
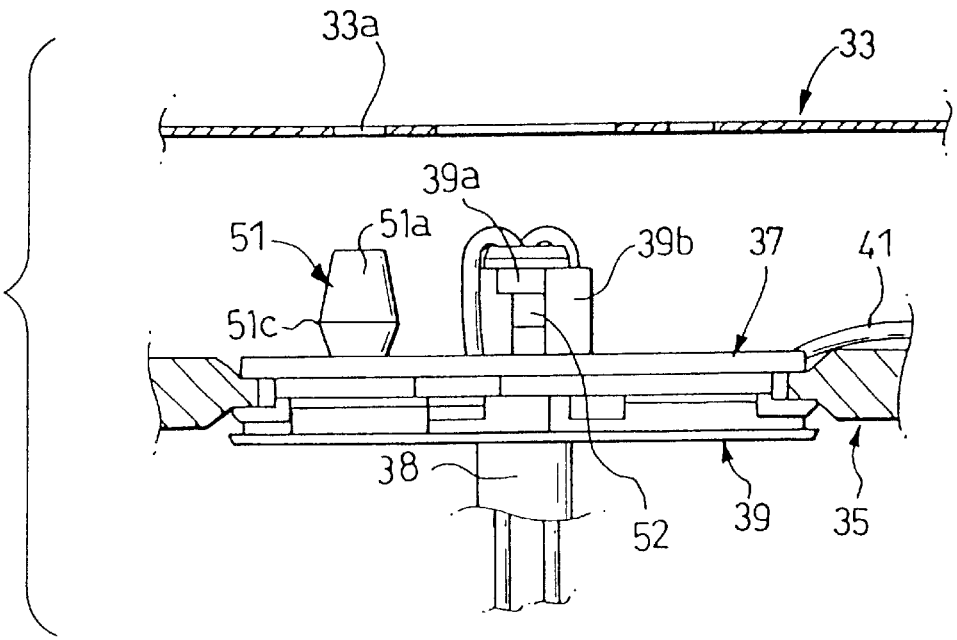
FIG. 12 is a cross-sectional view showing a state in which a main body is attached to the roof trim shown in FIG. 11.
Figure 13:
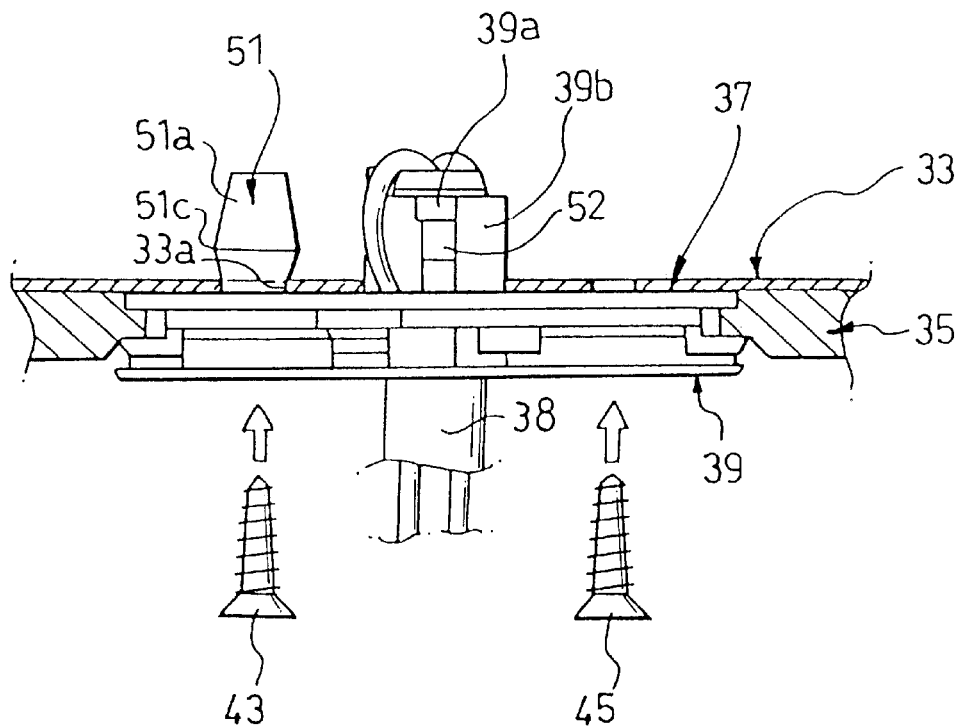
FIG. 13 is a cross-sectional view showing a state in which a roof panel is attached to the roof trim shown in FIG. 12.
Figure 14:
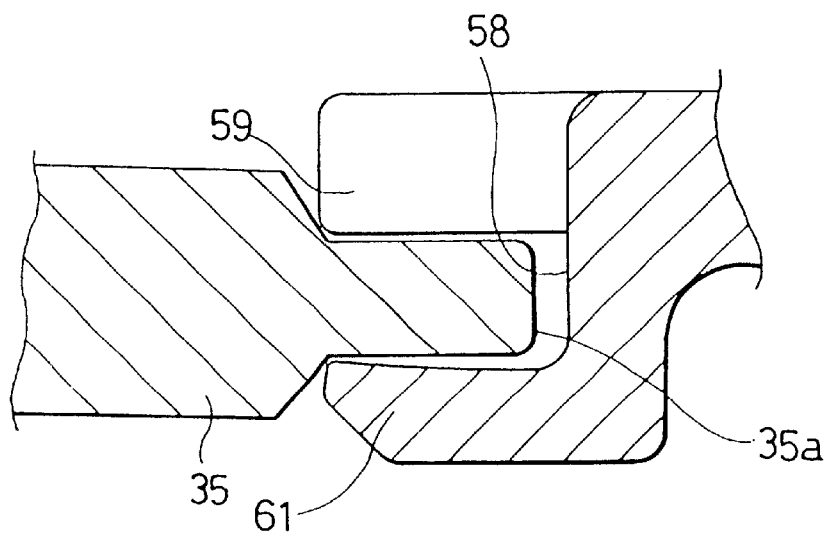
FIG. 14 is a cross-sectional view taken on the line B—B in FIG. 9, showing an engaging state in which the trim engaging member of the base member and the roof trim shown in FIG. 11 are engaged with each other.
Figure 15:
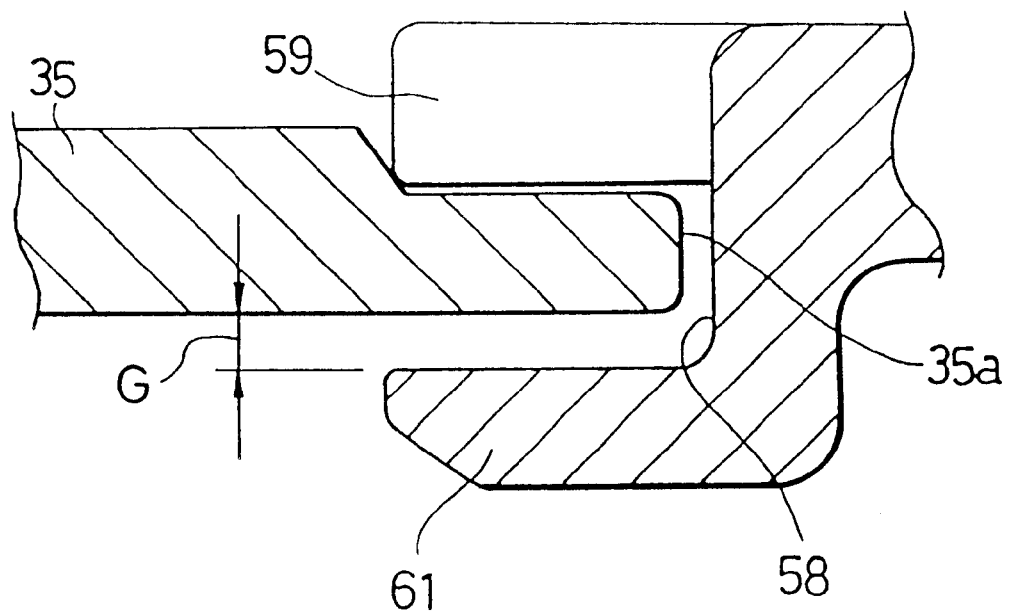
FIG. 15 is a partially enlarged view showing a case in which the roof trim is thin.

As shown in FIG. 6, the cross-section of the elastic fitting section 3 is a substantial U-shape. The flexible piece 3*a*, in which a space for bend is formed, is vertically arranged outside at the base bottom section in such a manner that the flexible piece 3*a* rises upward. On the outer circumferential face of the flexible piece 3*a*, there are provided a non-slip section 9 composed of a plurality of transverse grooves coming into contact with the peripheral edge face of the attachment opening 35*a*.

According to the elastic fitting section 3 of the base member 7 composed as described above, as shown in FIGS. 6 and 7, when at least a portion of the flexible piece 3*a* of the elastic fitting section 3 comes into contact with the peripheral edge face of the attachment opening 35*a*, the base member 7 can be positively engaged with the roof trim 35.

Accordingly, the base member 7 can be attached to roof trims 35 of various thickness without being restricted by the thickness of the roof trim 35. That is, one type of bracket 1 can be assembled to various types of roof trims 35.

Next, referring to FIGS. 2 to 5, brief explanations will be made into a procedure by which the bracket 1 composed as described above is attached to the roof trim 35 and the roof panel 33.

Figure 2:
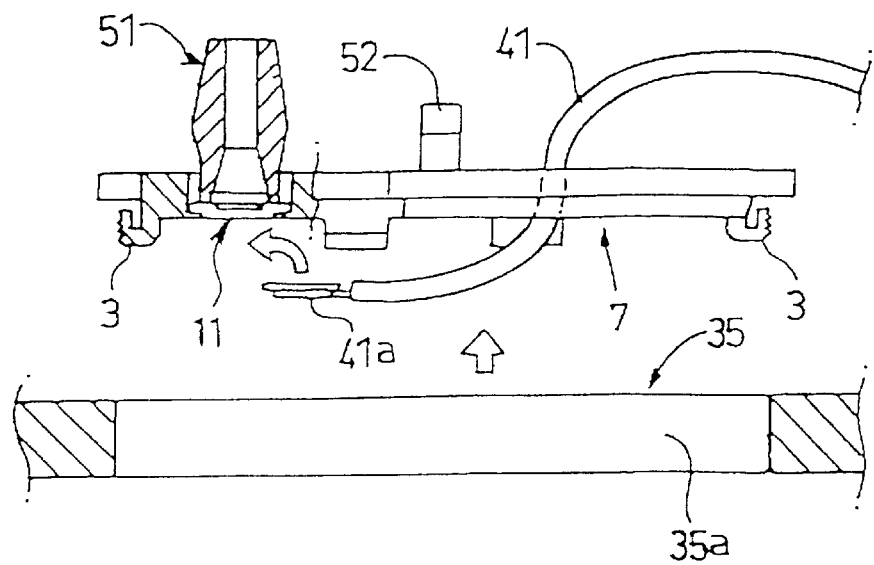
FIG. 2 is a cross-sectional view for explaining an initial stage of assembling the bracket of the present invention.
Figure 3:
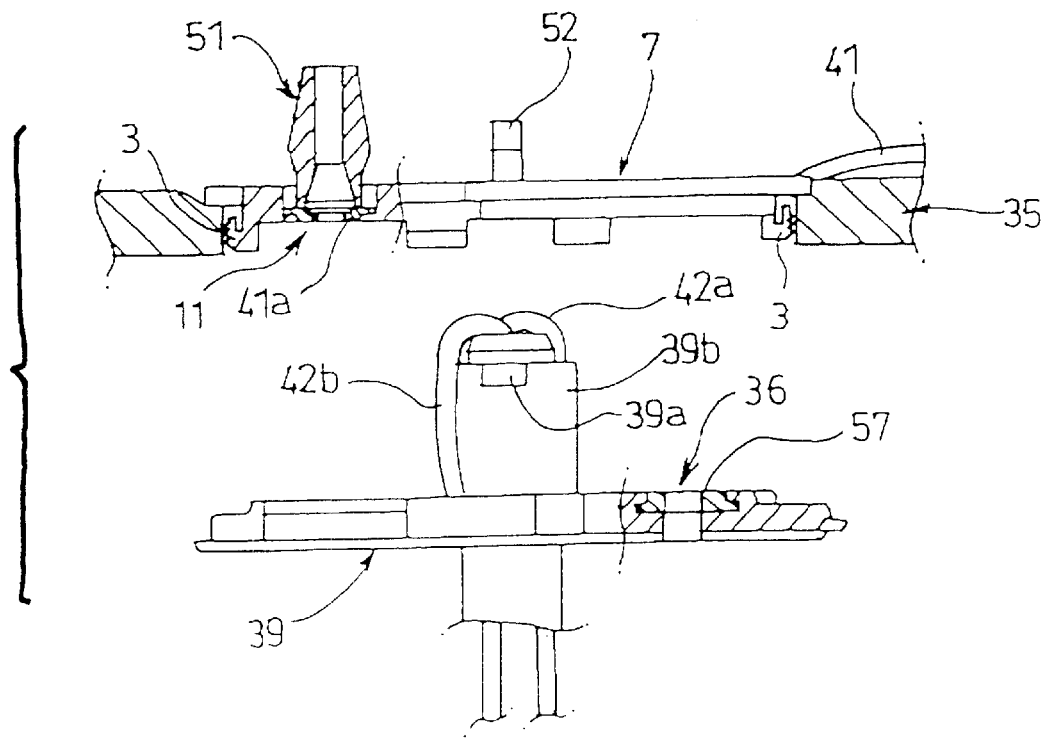
FIG. 3 is a cross-sectional view showing a state in which the base member is attached to the roof trim shown in FIG. 2.

First, as shown in FIGS. 2 and 3, after the terminal 41*a* of the power supply electric wire 41 has been held by the electric connecting section 11 of the base member 7, the base member 7 is engaged in the attachment opening 35*a* being inserted from an upper position.

At this time, as shown in FIG. 6, two opposed portions of the peripheral edge of the attachment opening 35*a* are pushed outside by the elastic action of the elastic fitting section 3 of the base member 7. Due to the foregoing, the base member 7 is engaged with the roof trim 35.

Figure 4:
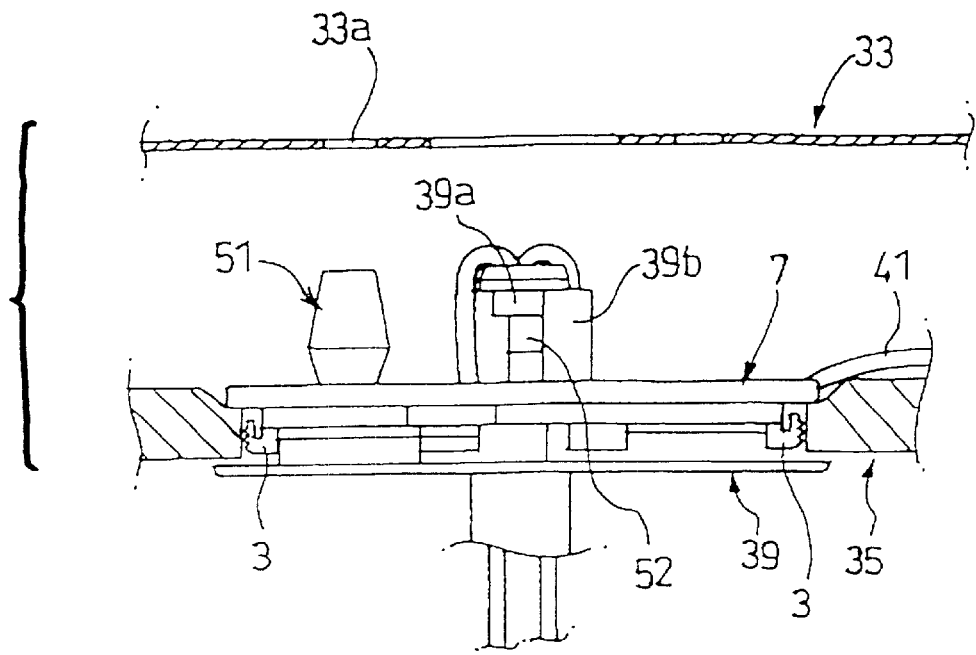
FIG. 4 is a cross-sectional view showing a state in which a main body is attached to the roof trim shown in FIG. 3.

Next, as shown in FIGS. 3 and 4, a cylindrical section 39*b* of a main body 39, in which a terminal 57 and others of the end portions of the electric wires 42*a*, 42*b* are held by an electric connecting section 36 and others, is inserted into the opening 8 (shown in FIG. 1) of the base member 7. At this time, an engaging protrusion 39*a* of the cylindrical section 39*b* is engaged with a flexible piece 52 of the base member 7. Therefore, the main body 39 is detachably engaged with the base member 7 attached to the roof trim 35. Accordingly, this roof trim 35 can be handled as a roof module in which a sun visor having illumination is previously integrated into one body via the bracket 1.

Figure 5:
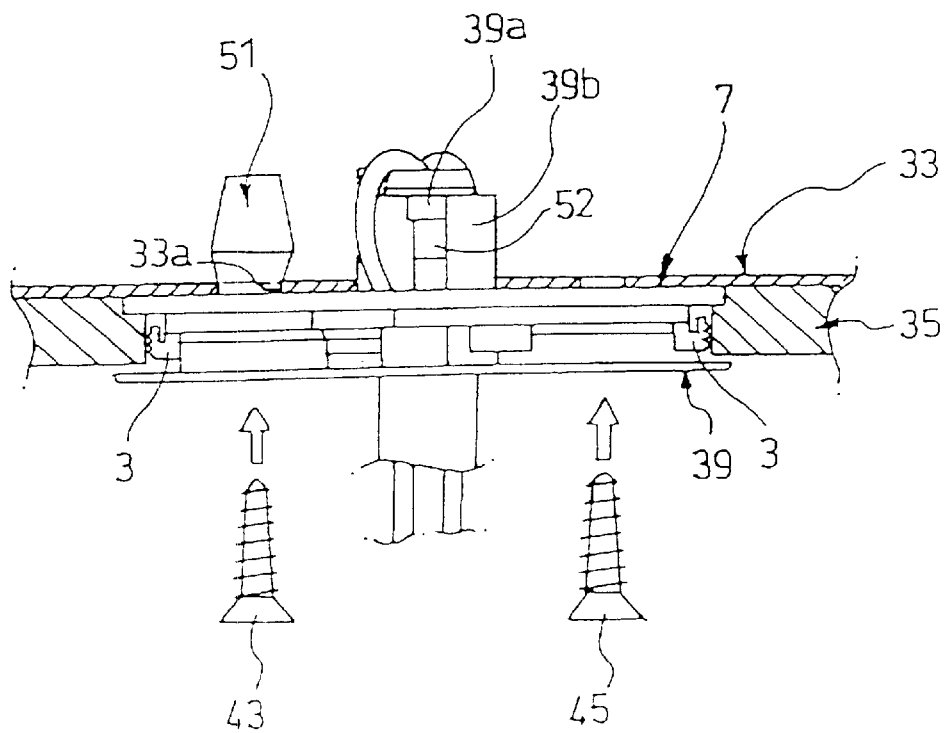
FIG. 5 is a cross-sectional view showing a state in which a roof panel is attached to the roof trim shown in FIG. 4.

At the final stage, as shown in FIGS. 4 and 5, the roof trim 35 which has been formed as a roof module is attached to the roof panel 33. That is, when a panel engaging member 51 of the base member 7 is press-fitted into a fitting hole 33a of the roof panel 33, the roof trim 35 can be engaged with the roof panel 33. When the screw members 43, 45 are fastened, the attaching work for attaching the sun visor having illumination is completed.

As described above, in the bracket 1 of this embodiment, a portion of the outer circumferential face of the fitting section 2 is composed of the elastic fitting section 3 capable of being pushed in the outer circumferential direction, and the non-slip section 9 coming into contact with the peripheral edge face of the attachment opening 35a is provided on the outer circumferential face of this elastic fitting section 3. Therefore, the bracket 1 of this embodiment can be easily attached to the roof trim 35. Further, there is no possibility that the roof trim 35 and the base member 7 become rickety.

Accordingly, the thickness of the roof trim 35 to which the bracket 1 is attached is not restricted, and further no noise is generated. Therefore, the working efficiency can be improved, and the reliability can be also improved. Further, the bracket 1 of this embodiment can be applied to the roof trims 35 of various sizes.

When the non-slip section 9 is composed of a plurality of transverse grooves, it is hard for the base member 7 to slip in the direction of disengagement. Therefore, the reliability can be more enhanced.

Further, when the elastic fitting section 3 is formed into an elongated plane arc shape, the contact area of the roof trim 35 with the elastic fitting section 3 is increased, and further the elastic fitting section 3 is curved into an arcuate shape. Therefore, it is possible to prevent the base member 7 from becoming rickety and further it is possible to prevent the base member 7 from being displaced even when external forces are given to it in various directions.

It should be noted that the present invention is not limited to the above specific embodiment, and variations may be made by one skilled in the art without departing from the scope of the invention. For example, in this embodiment, the elastic fitting section 3 is provided with the flexible piece 3a of the cantilever type, however, as elongated as an elastic pushing force directed outside can be generated, any type elastic engaging section may be used, for example, an elastic engaging section, both the end portions of which are supported, having a bend space inside, may be used. In this embodiment, the non-slip section 9 is composed of a plurality of transverse grooves, however, the non-slip section 9 may be composed of a rough face having a plurality of small protrusions.

What is claimed is:

1. A bracket for attaching an interior equipment of a vehicle into an attachment opening formed in an interior wall member covering an inner face of a vehicle body panel, comprising:

a base member placed on the attachment opening from a first side facing the vehicle body panel;

a main body provided with the interior equipment, and engaged with the base member from a second side facing the interior of the vehicle for holding the interior wall member therebetween, said second side being opposite said first side; and an elastic fitting member formed on the base member so as to elastically contact with an inner circumferential face of the attachment opening.

2. The bracket as set forth in claim 1, wherein the elastic fitting member has a contact face provided with a non-slip member with respect to the inner circumferential face of the attachment opening.

3. The bracket as set forth in claim 2, wherein the non slip member includes a plurality of transverse grooves.

4. The bracket as set forth in claim 1, wherein the elastic fining member is arcuately elongated along the inner circumferential face of the attachment opening.

5. The bracket as set forth in claim 1, wherein the elastic fining member elastically contacts the inner circumferential face of the attachment opening from a direction normal to the inner circumferential face.

* * * * *